April 9, 1957     G. F. SCHERER     2,788,015
BALL VALVE Filed April 23, 1952     3 Sheets-Sheet 1

INVENTOR
GEORGE F. SCHERER
BY Strauch, Nolan & Diggins
ATTORNEYS

April 9, 1957  G. F. SCHERER  2,788,015
BALL VALVE

Filed April 23, 1952  3 Sheets-Sheet 3

INVENTOR
GEORGE F. SCHERER

BY Strauch, Nolan & Diggins
ATTORNEY

# United States Patent Office 2,788,015
Patented Apr. 9, 1957

2,788,015

BALL VALVE

George F. Scherer, Oakland, Calif., assignor to Rockwell Manufacturing Company, Pittsburgh, Pa., a corporation of Pennsylvania Application April 23, 1952, Serial No. 283,879

36 Claims. (Cl. 137—246.16)

This invention relates to ball type valves for high pressure and large pipe line service and is particularly directed to such valves wherein provision is made for supplying an adequate plastic film of sealing material to either or both of the seats between the ball and the valve body, and wherein provision may be made for jacking the ball from its seat through the medium of lubricant pressure.

The invention relates more particularly to two-way, so-called ball type valves in which the seating surfaces are the curved surfaces of a spherical zone wherein provision is made to supply an adequate plastic film of sealing and lubricating material to the spherical zone seating surfaces between the valve body and the valve plug, and wherein provision is made for separating the plug and seats through the medium of generating increased pressure of the sealing material.

In present day pipe line service it has been customary to employ tapered plug valves with the plugs having rectangular through openings aligned with the pipe line at opposite sides, provision being made for providing sealing films of lubricant between the plug and body surfaces of the valve for preventing escape of line fluid. In most of these plug valves, provision is also made for jacking the valve plug in a direction parallel to the axis of rotation of the plug whereby frozen plugs may be released for turning, and the effect of upstream pressure tending to tightly press the plug against the downstream side of the body bore may be relieved to lessen the torque required to turn the plug.

Each of these plug valves, because of its structural form, provides a restriction in the pipe line which results in pressure losses. Furthermore, it has become customary, in long distance pipe lines which handle fluids that may deposit or form residues on the lining of the pipe and thereby cut down the effective diameter of the pipe and increase fluid friction between the fluid being handled and the pipe line, thereby resulting in excessive pressure losses, to periodically scrape the interior of these pipe lines to clean and restore them to the original diameter. The restrictions in the pipe line offered by present-day plug valves have produced difficulties because a scraper which will pass the main pipe line may not pass through the restriction in the rectangular opening valve, so that special cleaning efforts and devices are necessary to remove the scraped material at these valves.

Since it is practically universally accepted in the art that these lubricated plug valves are the only valves capable of handling these high pressures and for large pipe line services, these difficulties have been substantially accepted as unavoidable. Furthermore, since quick opening and closing is extremely desirable, and often necessary, plug valves that require only rotation through 90° between fully open and fully closed positions fulfill this requirement better for example than gate valves, some of which take considerable time to open or close because of the necessarily high mechanical advantage required in the threaded stems. However, these plug valves by reason of their structure possess inherent conditions in operation that render them increasingly less desirable as the line pressure increases. For example, in the case of a plug valve which is rotatable within a bore upon an axis normal to the axis of the pipe line in which it is situated, when the valve is in closed position the upstream pressure tends to separate the valve plug from the upstream side of the bore and to urge it against the downstream side of the bore. Where the valve plug and its associated bore are of tapered conical or cylindrical shape, the plug contacts the bore at the downstream side in substantially only a straight line contact above and below the downstream port in the bore leading to the pipe line, the plug thus being positioned eccentrically in the body. This means that, in the absence of some special added sealing arrangement, this line contact is ineffective in providing a satisfactory mechanical seal between the plug and the bore to resist leakage of the fluid from the upstream side of the valve, the fluid passing around the sides and over the top and bottom of the plug. Since the line contact between the plug and the bore substantially bisects the downstream port opening, and since the width of the ports must be appreciable, there are appreciable spaces between the side edges of the downstream port and the plug which permits the upstream fluid to escape past the plug and therefore through the valve.

In plug valves as used in high pressure service, this problem is generally taken care of by so-called plastic sealing or lubrication of the valve wherein the essential and primary function of plastic lubricant material which is introduced between the plug and the bore metal seating surfaces is to provide an adherent plastic sealing film which will resist displacement by the pressure of the upstream fluid.

As line pressures become higher and as the pipe line sizes increase with attendant increase in port areas and differential total pressure exerted on the plug, the spaces which must be sealed by the lubricant become increasingly larger, and when the spaces around the sides of the plug become so large that the high pressure fluid can act upon sufficient sectional area of the lubricant film, it will remove the lubricant seal and the plug valve will leak.

With higher line pressures, more viscous and more adherent lubricants have been proposed for sealing the increasingly wide spaces between the plug and the bore, but this practice is of course limited considerably by difficulty in introducing high viscosity plastic materials through the necessarily limited lubricant supply bore and channel formations and also in introducing them into the film size space between the plug and the bore.

It has been proposed to increase the sizes of the plugs in these valves for high pressure pipe line assemblies, but sealing difficulties increase considerably as the plug sizes become larger, the turning effort is materially increased, the lubricant pressures necessary for jacking become quite large, and the very practical disadvantage of tremendously increased manufacturing costs tend to discourage this line of development.

It has also been proposed to provide valves having full round openings for optimum fluid flow conditions and minimum pressure losses. Plug valves with such full round openings necessarily must be larger than those in the same capacity having rectangular openings, and in these larger round opening valves the same sealing difficulties and higher turning efforts are encountered.

The present invention therefore contemplates the provision of a valve for high pressure large pipe line service which has metal to metal seating surfaces of appreciable area with provision for a relatively low turning effort between 90° apart open and closed positions and which has a full round opening equal to the pipe line diameter to prevent flow lowering restrictions in the line and to enable standard scrapers to be pulled through the valve as though it were a substantial continuation of the pipe line. The ball type valve wherein the movable valve element is a substantially spherical ball rotatable about an axis perpendicular to the pipe line axis on cooperating spherical seats is used in the invention because it affords the desirable full round opening with uniform wide continuous seating surfaces and 90° turning between open and closed positions.

The ball type valve has furthermore been selected for purposes of the invention because the spherical seats being partially coextensive with the surface of the ball, are in full surface contact therewith over a substantial area to afford a sufficient area wherein the bearing pressures per unit area are widely and evenly distributed, and provide a complete circular area of sealing surface about the ports. High line fluid pressures therefore are supported over the full seating surface area thus provided.

Ball type valves have, of course, been known for years and many different ball valve constructions are in every day use particularly in water sprinkler systems and others with relatively small pipe lines where the pressures are relatively low. A survey of the commercial ball type valves in present day use for this service shows that they are limited to comparatively small sizes and low operating pressures. Some of these ball valves have special and complicated expensive arrangements for handling higher pressures. Such valves would of course be useless in a gas or oil pipe line of large size, for example, where the pressures are upward of one thousand pounds per square inch with consequent total seating pressures that are very large when in the shut-off position.

I have found that the presently available ball type valves on the market, when subject to high line pressures, particularly in large size valves, either present extremely high operating torques when made with fiber seat inserts or fail to seal satisfactorily when metal seats are provided. Further even if the metal seats provide an initially satisfactory seal, the corrosion or pitting of such seats by line fluid or wearing or scratching due to debris in the line soon results in leakage.

I have found that the inability of these present day ball valves to withstand high line pressures is the result of their present construction wherein the upstream and downstream seats are usually part-spherical insert rings of fiber, asbestos or other substantially resilient and deformable material which are urged tightly against the ball surface in the valve assembly so that they may deform and conform accurately to the ball surface over a wide area and thereby provide satisfactory sealing contact for the purposes under operating conditions. However, the very fact that these inserts are tightly and deformably pressed against the ball to obtain the seal proportionately increases the turning effort necessary to open and close the valve, and this has been a very important factor in limiting the size of such valves because the seating pressures needed for adequately sealing such valves to withstand leakage against high line pressures would render the ball operating torque so great the valve would not be practical.

Also, these fiber insert seats become worn after some use, or they may become crystallized and hardened and set and therefore no longer resilient after the passage of time and through deterioration by the fluid being handled. They must be very carefully selected to avoid the eroding and corroding effects of line fluid and to avoid deterioration under high temperature operating conditions. Hence, I have not been able to adapt present day ball valves to my purpose simply by increasing the size or making other such conventional changes in such valves. It has been necessary to provide a valve having an entirely new structure and mode of operation to satisfactorily solve the above mentioned problems.

A unique advantage of ball valves over hitherto used plug valves is the accuracy with which the former can be made without undue expense or labor. When a tapered or cylindrical valve plug is machined, or the valve body seat is bored, the cutting tool will not give uniform depth of cut during a longitudinal traverse because of the discontinuity of the cut in passing over the port openings. The spherical seating surfaces of the plug and the body seats of my improved valves can be machined in a continuous non-interrupted cut, which increases the accuracy of the parts and reduces manufacturing costs substantially. This also facilitates interchangeability of valve bodies, plugs, and seats in the present invention, and replacement of worn or defective parts.

In prior conventional plug valves, costly structures including excessive metal thicknesses and external ribs or other means must be used to provide sufficient rigidity to minimize body deflections caused by pipe line pressures, pipe strains, and temperature changes, and the like, which result in concentrated seating surface loads rather than distributed loading and consequently excessive operating torques. In my improved ball valves, the construction is such that the body deflections do not appreciably affect the operating torque. This is accomplished in the preferred embodiment of the invention by the use of floating seats and a floating plug non-integral with the body structure, which provide for essentially uniformly distributed seating pressures and materially reduced weight and costs.

It is well known that in the conventional plug cock even of the lubricated type the shut-off seal is effected at the downstream seat only, and by tapping into the side of the body leakage past the upstream seat may be observed. My present invention provides for double sealing against line fluid leakage when the valve is in the shut-off position, a drop-tight seal being provided on both the upstream and the downstream seats. Since both seats are always in continuous seating contact with the ball plug and a plastic lubricant seal is provided in an unbroken ring completely surrounding the ports on both the upstream and downstream seats in both the fully open and fully closed position, a drop-tight seal is maintained at all times. Thus double insurance is provided for sealing in the event that one or the other of the seating surfaces becomes damaged through corrosion or scoring or other failure to maintain a tight shut-off.

Also in certain services such as in oil refineries, as a safety precaution, it is common practice to provide two valves closely adjacent to one another in a line and a bleeder connection in between, which, when both line valves are shut off and the bleeder valve opened, gives a visible indication of leakage past the upstream pipe line valve. In my improved valve, because of the seal at both seats, a bleeder connection may be tapped into the side of the valve between the upstream and downstream seats and used to provide a visible indication of leakage with a single pipe line valve, and which also eliminates the hazard of the downstream pipe line valve being inadvertently left open, which is present in such prior double valve installations.

It is the major object of my invention to provide a novel valve construction suitable for large pipe line and other high pressure services having a full round opening and adequate bearing area with provision for both lessening the turning effort of the valve element and effecting a tight shut-off against the line fluid.

It is a further object of my invention to provide a novel ball valve construction for high pressure and large pipe line services wherein depending upon the direction of flow the ball has substantially metal to metal contact with the downstream seat over a sufficiently wide annular spherical area to adequately support the thrust of the ball resulting from high line pressures, and special lubricant grooves are provided at both upstream and downstream seating surfaces for providing a plastic sealing film preventing leakage of line fluid past the valve.

A further object of my invention is to provide a novel lubricated ball type valve having provision for jacking the ball from its seats when the valve is in either open or closed position, or an intermediate position.

It is a further object of my invention to provide a novel ball-type valve wherein the spherical seating surfaces are provided with wide lubricant grooves that extend around the port opening and provide means for hydraulically jacking the plug from either or both seats with feasible unit lubricant pressures.

A further object of my invention is to provide a ball-type valve wherein lubricant grooves are provided about the port in the seats and wherein provision is made for cutting off the supply of lubricant to these grooves when the valve is being turned between fully open and fully closed positions, and wherein jacking of the plug may be accomplished if stuck, regardless of in what position the plug may be disposed.

It is a further object of my invention to provide a lubricated valve in which body deflections, either intentional or otherwise, are not transmitted to the seats and plug with consequent increase in operating torque or leakage.

A further important object of the invention is to provide a novel two-directional lubricated spherical zone seat valve (so-called ball valve) having a special body structure that has controlled or predetermined axial deforation under lubricant jacking pressures, or differential line pressures.

Another object of my invention is to provide a lubricated valve with floating seats embodying novel arrangements for introducing a plastic sealing lubricant between the seating surfaces of the plug and the floating seats.

A still further object of my invention is to provide a novel lubricated two-directional valve assembly having interchangeable floating valve seat rings which seal against leakage past the seating surfaces and around the rings.

A still further object of my invention is to provide a novel resiliently backed and sealed floating lubricated valve seat arrangement.

Further objects of the invention will presently appear as the description proceeds in connection with the appended claims and the annexed drawings wherein:

Figures 1, 3:
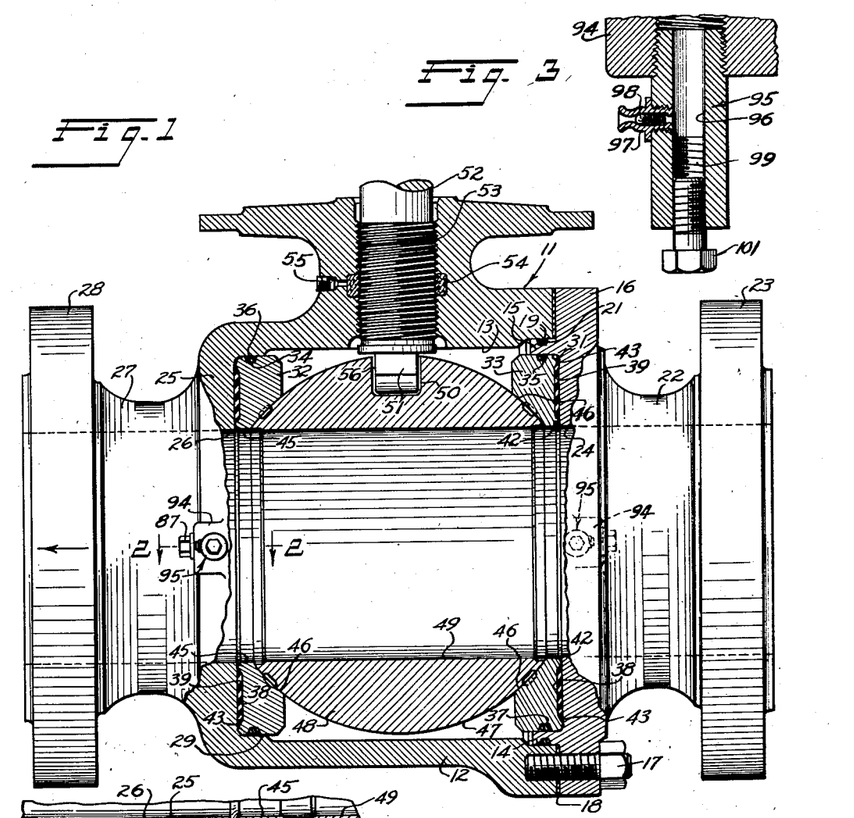
Figure 1 is a side elevation, partly broken away and in section, illustrating a lubricated spherical zone seating or ball-type valve according to a preferred embodiment of the invention.
Figure 3 is a section illustrating a lubricant reservoir fitting adapted for use in the form of invention shown in Figure 1.

As shown in Figure 1, metal valve body 11 has cylindrical wall 12 provided with internal cylindrical surface 13 and annular pilot bore 14 for cylindrical locating shoulder 15 of tail piece flange 16 which is secured to body 11 as by studs 17. A suitable shim assembly 18 is used to provide proper assembly clearance and a sealing O-ring 19 is compressed in annular groove 21 on cylindrical locating extension 15 to provide a fluid tight seat with bore 14. Flange 16 is formed integrally on body end section or tail piece 22 having outer flange 23 for attachment of the valve to a pipe line, and a cylindrical flow passage 24.

End wall 25 of body 11 has a cylindrical passage 26 of the same size and co-axial with passage 24 which extends through integral body section 27 and pipe attachment flange 28.

Cylindrical recess 29 is provided at the juncture of walls 12 and 25, and is co-axial with and of the same size as cylindrical recess 31 formed within extension 15 of flange 16. Metal valve seat rings 32 and 33 fit with sliding clearance into recesses 29 and 31, and annular grooves 34 and 35 in their peripheries contain sealing O-rings 36 and 37 or other suitable members that effect a sliding fluid-tight seal with the surfaces of recesses 29 and 31 and permit small axial displacement of the seat rings relative to the valve body in operation of the valve. For ordinary temperature ranges O-rings 36 and 37 are preferably of oil resistant synthetic rubber which is suitable for most pipe line services. Where higher temperatures are encountered, rings of "Teflon," "Silastic," or like plastics may be used.

Figure 2:
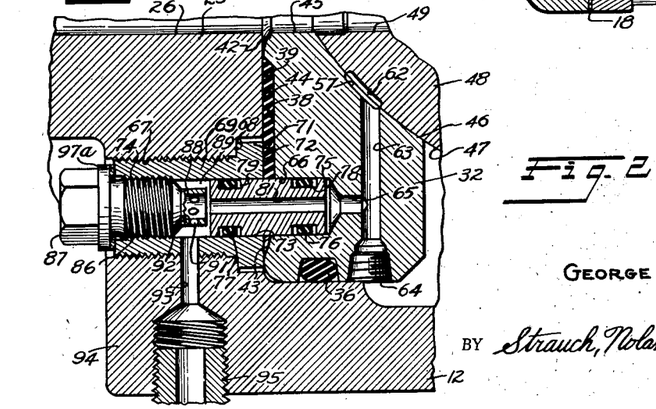
Figure 2 is an enlarged fragmentary view in section, illustrating details of the lubricant system of the form of invention shown in Figure 1.

Seat rings 32 and 33 are each provided with a wide shallow back surface groove or cavity 38 in which sorber pads 39 of rubber or the like are mounted. The lands forming groove 38 preferably have curved surfaces 42 and 43 adapted to abut the flat inner surface 44 of wall 25, as shown in Figure 2. The deformation of slightly curved surfaces 42 and 43 under the compressive load of full differential line pressure loading is very small because of the large available thrust load area. While these surfaces could be made flat, the combination of curved surfaces 42 and 43 with the sorber cavity 38 and pad 39 function to exclude any foreign particles in the line fluid larger than the clearance, which might lodge between the thrust load bearing surfaces. Other particles which may find their way into the sorber cavity may remain suspended until later axial contraction of the valve body occurs, at which time if not flushed out they may be absorbed or embedded in pad 39.

Bores 45 of rings 32 and 33 are cylindrical and co-axial with, and of the same size, as opening 26. Rings 32 and 33 are provided with annular spherically curved seating surfaces 46 for the spherically curved annular mating surface 47 of ball plug 48, which is provided with cylindrical port 49 at least as large as passage 24 and 26. In practice, the unit seating pressures employed or the diametrical ratios of ball plug to port orifice may be varied depending upon the line pressures and valve sizes. In the embodiment of my invention illustrated and for general use, a ratio of 1.7 to 1.0 for the ball to port diameter is used. However, ratios of as high as 3.0 to 1.0 or more, or as low as 1.5 to 1.0 or less, may be desirable depending upon the valve sizes, line pressures, and operating torque desired. I have also found that a unit seating load of about 1450 pounds per square inch provides a very satisfactory operating torque in 4-inch and 8-inch valves built for handling line pressures of 2000 pounds per square inch or thereabout.

The upper end of plug is arcuately slotted at 50 to freely receive a mating arcuate surfaced tang 51 on the bottom of a valve stem 52 which is rotatably mounted in the valve body as by a running thread engagement at 53. Annular chamber 54 surrounds the valve stem for admission of a plastic sealing material under pressure through radial passage 55 to pack the stem in the well-known manner. Any other suitable packed operating stem construction may, however, be used as will be apparent to those skilled in the art.

Figures 4, 5, 6, 7:
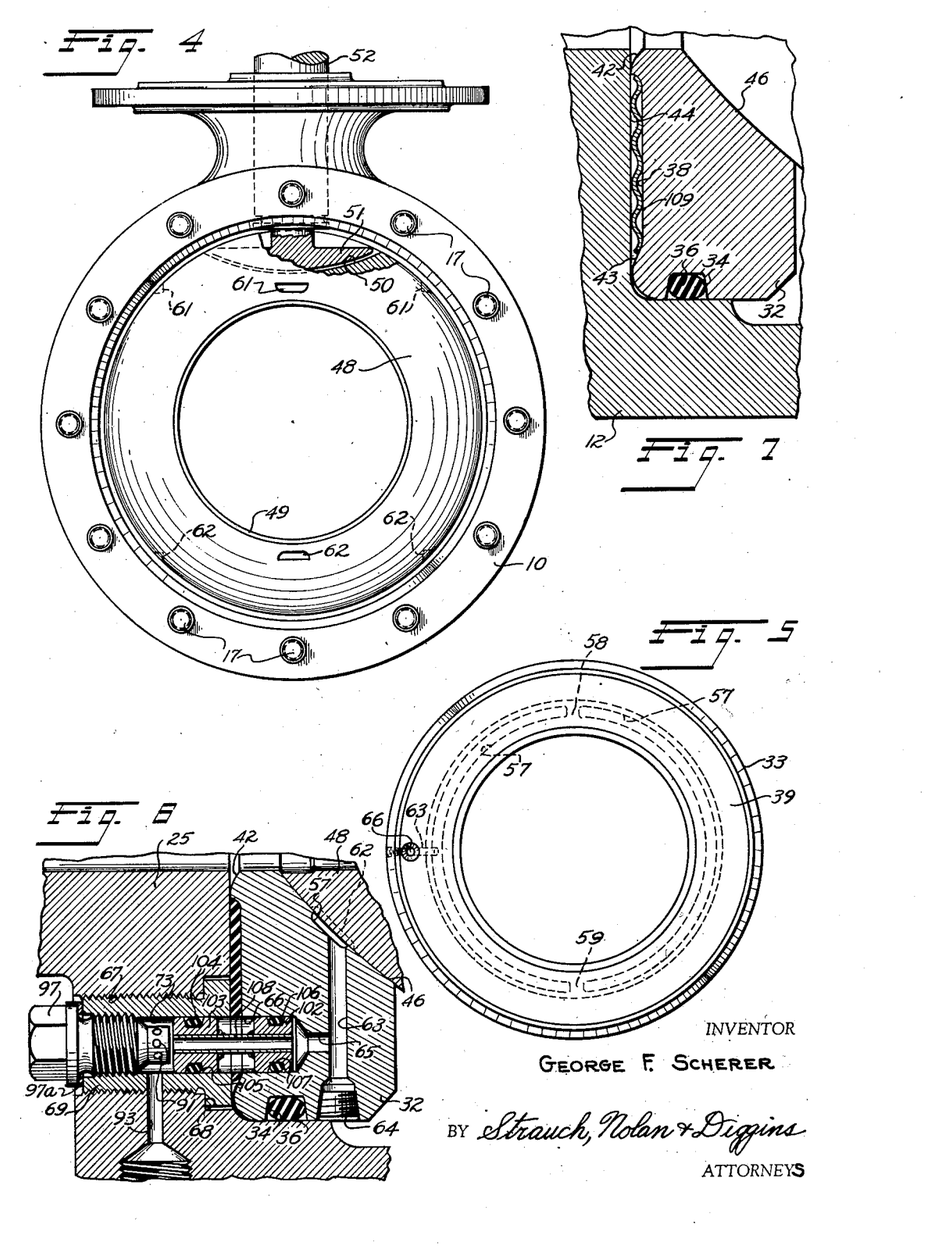
Figure 4 is an end elevation partly in section of the valve of Figure 1.
Figure 5 is a rear elevation of a preferred seat ring for use in the valve of Figure 1 showing the valve seat sealant and lubricant distributing grooving.
Figure 6 is a section similar to Figure 2 showing a modified lubricant passage system particularly for use in a larger valve.
Figures 7, 8 and 9 are enlarged fragmentary views in section of further embodiments of the invention wherein the valve seat rings are resiliently seated.

As illustrated in Figure 1, tang 51 is narrower than slot 50 and has sufficient clearance 56 in the slot to permit sufficient limited movement of plug 48. Referring to Figure 4, it will be noted that tank 51 is of considerable length within slot 50. This long tang and its provided clearance in the slot permits any desired limited controlled rotation and displacement of the plug with respect to the center line of the valve casing, either normal to or in the direction of line of flow, thus providing for proper seating of the plug and alignment of the lubricant and sealant grooves in the seats with the connecting lubricant grooves in the plug now to be described.

Also I may use a small centering pin arrangement between the plug and the stem for preventing undue radial rotation of the ball plug around its axis but permitting ample play for maintaining its floating characteristics between the seats. Any other suitable connection permitting the required movements of the plug with relation to the operating stem may be utilized.

Tang 51 as shown is so positioned that the required axial movement of the plug is provided for by the clearance between the arcuate bottom of the tang and the complementary arcuate plug slot surface. If the tang position is changed by 90° with relation to the flow direction through the plug, the axial movement is then provided by the side play.

As illustrated in Figure 5, each valve seat surface 46 is formed with shallow lubricant grooves 57 of substantially uniform depth interrupted by diametrically spaced lands 58 and 59. The surface of plug 48 is provided with short grooves 61 and 62 long enough to bridge the lands 58 and 59 in fully open and fully closed positions of the ball, which positions are 90° apart and determined by suitable co-acting stops (not shown) on the stem and valve body. When the lands are so bridged by the short grooves, grooves 57 become effectively continuous about the ball on opposite sides thereof.

Grooves 57 are adapted to receive a plastic sealing material which also lubricates the plug for turning movement and provides a hydraulic force for jacking the plug and seats axially apart. The amount of hydraulic jacking force required is provided by the area of the lubricant grooves multiplied by the unit fluid pressure exerted on the plastic lubricant. Thus either the groove area or the unit pressure of the lubricant may be varied as desired.

As illustrated in Figure 2, seat rings 32 and 33 are each provided with radial passage 63 communicating with groove 57 and closed at its outer end by a threaded plug 64. Cross passage 65 in the ring intersects passage 63 and is enlarged at its outer end to provide a bore 66. A still further enlarged threaded bore 67 is formed in body wall 25 co-axial with passage 65 and is enlarged at its inner end to provide a shoulder 68. Hollow sleeve 69 is externally threaded to fit into bore 67 and has an enlarged head 71 within shoulder 68, so that in the position of Figure 2 the flat smooth head surface 72 of the sleeve substantially fills the recess and is a substantial continuation of inner face of wall 25.

Interiorly sleeve 69 has a smooth bore 73 co-axial with and of the same size as bore 66, and an outer threaded bore section 74. Cylindrical conduit member 75 extends between sleeve 69 and seat rings 32 and 33 with its opposite ends snugly but slidably received in bores 66 and 73. Sealing O-rings 76 and 77 compressed in annular grooves 78 and 79 seal the periphery of the conduit member fluid tight with bores 66 and 73, respectively. In practice I have found it satisfactory to provide member 75 with a slide fit radial clearance of about 0.005" with the bores, although satisfactory seals have been obtained with a radial clearance of 0.010", which may be necessary in manufacturing very large valves. Conduit member 75, with the O-ring in place in the grooves, is simply assembled by being inserted through bore 73 into bore 66. Since the grooves 78 and 79 are equidistant from the ends of the member, it is not material which end is inserted first. Conduit 75 also functions to properly locate seat rings 32 and 33 circumferentially and to prevent rotation in their bores relative to the body, which would result in displacement of the grooves 61 and 62.

This arrangement also provides for removing or reinserting the conduit member if desired for inspection or replacement of the O-rings without disassembling the entire valve.

Central passage 81 is formed in member 75 co-axial with ring passage 65. Closure plug 86 having a hexagonal head 87 is threaded into bore 74 and is so formed that when drawn tight against its sealing gasket 97a, its inner reduced end 88 does not engage the end of member 75 but provides sufficient clearance at its ends to permit the necessary axial movement of the seat ring 32 or 33 in operation without malfunctioning of the O-rings 76 and 77. Between the plug and member 75 an annular chamber 89 is thus provided which communicates with passage 81 directly and by radial openings 91 and axial passage 92 in the plug end. Passage 93, formed in boss 94 on wall 25, has a threaded outer end in which is mounted a lubrication fitting 95 (Figures 2 and 3) having a reservoir 96 and a filler fitting 97, including a one-way check valve 98. The end of fitting 95 is in axial alignment and communication with reservoir 96 and is provided with a suitably tapped bore 99 which threadedly receives a closely fitted headed lubricating screw 101. Screw 101 in use is backed out of bore 99 sufficiently during filling of the reservoir, and is adapted to be periodically threaded into the bore to place the reservoir of lubricant under pressure and supply lubricant under pressure to the passages between plug 48 and its seats 46 to separate the plug and its seats 32 and 33 and provide lubrication for turning of the valve in its seats. If desired screw 101 may be made hollow and fitting 97 may be threaded into its hollow end rather than in fitting 95, or fitting 95 may be replaced by an Alemite fitting for grease gun lubrication, or any other standard external lubricator. Thus grooves 57 may be filled with lubricant under pressure from reservoir 96 through passage 93, chamber 89, openings 91, and passages 92, 81, 65 and 63.

In very large valves, the machining clearances between the external periphery of seat rings 32 and 33 and the body positioning members may inadvertently become so large that the necessary clearance around a solid conduit member like that at 75 in Figure 2 may impair the functioning of the O-rings. In such cases the structure of Figure 6 is preferred. In this construction the parts are the same as in Figure 2, except that the lubricant conduit comprises two individual short cylindrical blocks 102 and 103 slidably mounted in bores 66 and 73, respectively. Sealing O-ring 104 is provided in annular peripheral groove 105 to seal fluid tight with bore 73, and sealing O-ring 106 is provided in annular peripheral groove 107 to seal fluid tight with bore 66. Blocks 102 and 103 are fixedly interconnected by a resilient flexible thin-walled tube 108 which is brazed, welded or otherwise secured in place. Tube 108 will withstand heavy internal lubricant pressures and functions as a lubricant conduit like passage 81 of Figure 2. When the seat rings are displaced with respect to the body due to differential line or jacking pressures, tube 108 merely flexes and, being resilient, returns to its normal alignment when the pressures are relieved. A thin-walled stainless steel tube 108, about ⅛ inch in bore diameter, is satisfactory in heavy valves involving up to 15,000 pounds per square inch lubricant pressure during jacking.

In the embodiment illustrated in Figure 7, annular springs 109, which may be crimped leaf springs, as shown, Bellville type springs, or any other suitable resilient means such as a spring section integral with the ring, are provided in seat 38 behind each seat ring 32 and 33 to exert resilient axial pressures on the rings. These springs must be used when the lubricant in grooves 57 is of the energizable, compressible, and expansible type such as "Hypermatic" lubricant, made by Rockwell Manufacturing Company, which consists of a plastic vehicle having therein a multiplicity of uniformity distributed discrete cells of compressible gas like air, and in the valve this lubricant is maintained in an energized condition under compressible in the lubricant reservoir and passages so that it automatically displaces itself to replace lubricant lost to the line during normal operation. Use of this construction is also desirable when utilizing standard non-compressible lubricants in that it widens the clearance range that may be used in the initial valve assembly. It is also useful in maintaining continuous seating contact between the plug and both seats in the event of very low line pressures being present in large valves, which in themselves might not be sufficient to quickly urge the seats and plug into contact.

When energizable sealant and lubricant is used, the lubricant tends to expand and separate the seat rings from the plug when line pressure is not present to hold the seat rings in contact with the plug. When the valve is closed this expansion force of such lubricants will oppose the action of the line fluid urging the upstream seat ring against the plug and without spring 109, so that undesired loss of lubricant to the line may result. This tendency is overcome by the action of springs 109 or equivalent resilient means having an effective compressed strength equal to the energized lubricant pressure load which it is desired to carry. In instances when a jacking pressure is required and applied, the counter-acting spring pressure is negligible when compared to the total lubricant jacking pressure, and also negligible in increasing the operating torque compared to the line pressure. Springs 109 are ample to maintain a suitable lubricant pressure or stored energy in the lubricant. By way of example, 200 to 300 pounds per square inch of lubricant pressure is ample to provide the required head for lubricant flowing through the valve passages. In general, the torque increases due to the use of such springs is about 3 percent with 200 to 300 pounds per square inch maintained lubricant pressure in an 8 inch valve subjected to 1500 pounds per square inch line pressure.

Figure 8:
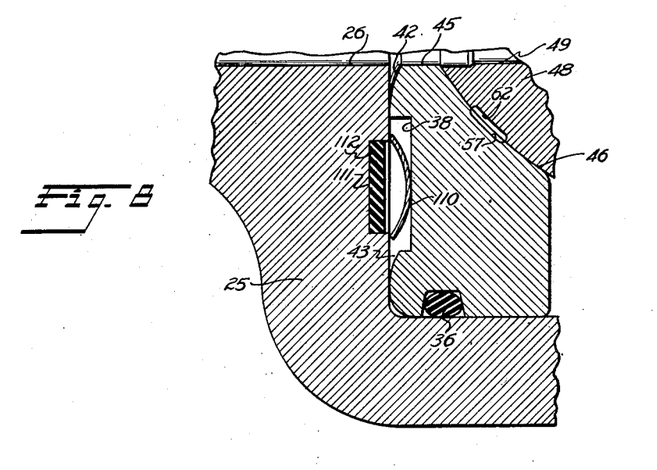

Figure 8 shows a further modification of resilient seat ring and sorber pad arrangement in which a series of separate bow-shaped springs 110 spaced around the annular groove or recess 38 which straddle an annular groove 111 containing a rubber sorber pad 112 for foreign particles that may be trapped in recess 38 in operation of the valve. The number and strength of spring 110 may be chosen in accordance with the spring reaction desired on the seat, and they may be spaced on opposite sides of the lubricating assembly of Figure 2 or 6 in a manner so as not to interfere with the lubricant assembly.

Figure 9:
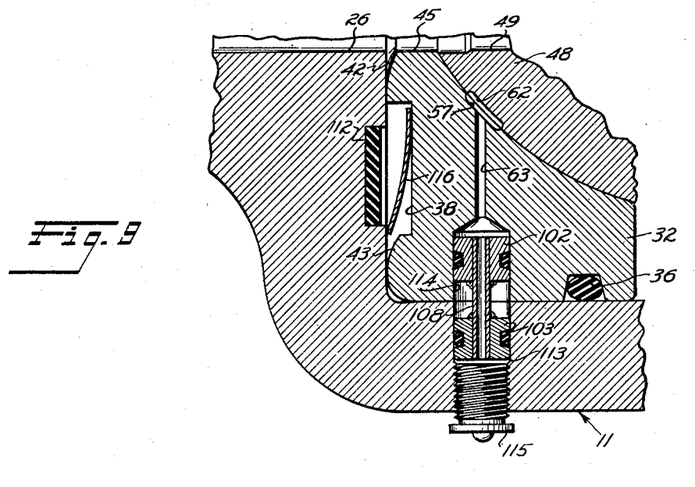

In valves with bolting flanges 23 and 28, such as shown in Figure 1, there may not be sufficient clearance for the lubricating injection assemblies illustrated in Figures 2 and 6. In such cases the lubricant may be injected into the sides of the valve as by the arrangement of Figure 9, which for both axial and normal to axial movements of the seat rings. In this construction the flexible tube and block lubricating assembly 102, 103 and 108 of Figure 6 is positioned in bores 113 formed in the side wall 11 of the valve and in aligned bores 114 of seat rings 32 and 33 which communicates through lubricant passages 63 to seat grooves 57. Threaded into the threaded outer end of bore 113 is an "Alemite" fitting 115 through which lubricant is injected. In this form of invention, a Bellville spring 116 is illustrated in recess 38 over sorber pad 112.

The valve illustrated is assembled by introducing seat ring 32 through the open end of the body and then dropping the ball 48 in place on the seat ring 32. Tail piece 22 is then secured over the end of the body with seat ring 33 in place and with a shim pack assembly 18 between the end member and body of sufficient thickness to provide predetermined snug contact clearances between the spherical surfaces of the ball and seat rings to provide satisfactory torque when turning of the ball during opening and closing of the valve. When the seat rings are spring-backed and properly adjusted for clearance and pressure, the shim assembly 18 may be eliminated and the end member is merely bolted tight upon the body with a conventional gasket between them. In this construction the valve must be removed from the line to permit removal of the plug. As will be apparent to those skilled in the art, however, the body may be designed in such manner, if desired, as to permit removal of the plug and inspection of the seats without removing the body from the line. Certain conventional Fairbanks ball valves have such constructions, and the valve of Humphreys U. S. Patent No. 2,333,424 utilizes an assembly of this general type.

Operation

Assuming for illustration that the direction of flow is as indicated by the arrow in Figure 1, and the valve is closed or rotated 90° from the Figure 1 position, the full line pressure bears on the plug and urges it against the downstream seat ring 32, and a controlled slight extension between the seat abutments results, due to the inherent resilience provided. The line pressure also urges the upstream seat ring 33 into tight surface engagement with the plug. This displacement of the upstream seat does not interfere with the lubricant distribution to the seating surfaces due to the functions of the lubricating mechanism of Figures 2, 6 and 9. Thus in my improved valves the axially slidable upstream seat always follows the plug and insures constant mating contact of both upstream and downstream seating surfaces 46 with the plug surface 47, regardless of the direction of flow, when in the closed position. In the open position without a differential line pressure on the plug, the seats are in mating contact as a result of the initial assembly procedure and as a result of the spring pressures exerted on the seats. Accordingly, continuous protection of the seating surfaces not heretofore attained in lubricated plug cocks is provided. This likewise provides double sealing shut-off on both upstream and downstream seats at the same time.

In the open position of the valve there is no appreciable axial elongation of the body due to line pressure, and, therefore, the body must be made to yield sufficiently to permit provision of an adequate lubricant film when under jacking pressures. In the closed position of the valve some axial elongation occurs due to holding back the mass of fluid, the effect of which is to separate the base of the upstream seat ring from its abutment, and, therefore, when jacking either seat ring from the plug the aforesaid separation is lessened without further elongation of the body, if the valve is under high line fluid pressure. I have found that an 8 inch valve of the described construction when subjected to line pressure of 1500 pounds per square inch elongates axially about 0.010 inch over-all when in the shut-off position. When in the open position the axial elongation was not over 0.001 inch. While the essential body contours should theoretically approach the spherical for providing maximum strength with minimum weight or cost, I have found it desirable to employ an essentially cylindrical form of body in certain instances, as shown, in order to provide satisfactory amounts of yielding means axially without an undue amount of such body elongation which would require unduly long lubricant injector pins for transmitting lubricant through the movable seats. This construction varies with the size of valve and pressure rating which it is desired to handle.

The thrust load of the seats may be distributed over the total base area of the seat or relatively concentrated upon the inner or the outer portion. If the load is essentially absorbed on the outer portion, the thrust load is absorbed entirely by shear stress in the body at the abutment and the cylindrical body wall. If the thrust load is absorbed essentially at the inner portion of the seat, the load is absorbed as a bending moment in the body should supporting the abutment. It is advantageous to absorb strains or deflections which may occur in the body rather than the seat rings to maintain better load distribution on the seats, with resulting minimum operating torques. In the preferred embodiment of the invention this is accomplished by the disclosed structures in which annular seat rings 32 and 33 are made sufficiently rigid to maintain uniform seating contact with the plug even when the valve body undergoes deformation during separation of the plug from one of its seats by jacking, or as a result of differential pressure when in shut-off position. When a generally spherical body is used, the inherent resiliency of the spherical valve body during deformation, together with the non-contact of the side walls with the plug, performs effectively as a spring backing for the seats. In the generally cylindrical body, as shown, however, essentially all of the yielding means is provided in the bending of the body shoulders which support seat rings 32 and 33. The construction employed in which the thrust load is transmitted from the outer and inner peripheries of the seat rings to the supporting shoulders preserves the desired seat rigidity and controls the amount of bending in the body shoulders.

The ball plug may be a full floating member of the valve ensemble and positioned only by the upstream and downstream seats of the valve. In the preferred embodiment of my present invention, as illustrated, the ball plug is also positioned only by the seats but by virtue of the construction employed, the floating seats are both in constant and uniform contact with the plug at all times, either in the open or closed position of the valve and with the differential line pressure being exerted in either direction of flow with the consequent deformations of the body. This is a great advantage in maintaining the seating surfaces in good condition, since they are thus protected from entry of the line fluid between the seating and sealing surfaces which occurs in conventional tapered or cylindrical plug valves and which over a period of time may corrode or erode these important areas, or deposit extraneous material such as hard gritty particles thereon, and result in increased operating torque.

In the conventional lubricated plug cocks heretofore used, alloy steels were generally not utilized for the purpose of reducing cost and weight. While alloy steels are available in much higher tensile strengths, their moduli of elasticity are essentially the same as the lower strength ordinary carbon steels. Thus they would essentially serve no better in controlling or reducing the body deflections which controlled the proper mating of the seating surfaces. In my present invention, body deflections do not affect proper mating of the seating surfaces. Alloy steels of higher tensile strength may, therefore, be used to advantage in reducing body weight and costs. Since the amount of deformation or strains in any structural member are controlled by the modulus of elasticity of the material used for their construction, it may, therefore, be desirable in some cases to use alloy steels for body material in my improved valves. Although they are of no greater modulus of elasticity and are slightly more expensive per unit weight, they are much stronger in tension than ordinary carbon steels and they, therefore, require much less metal for adequate tensile strength of the body. This reduces the valve weight and lowers costs.

While I have shown several mechanisms to lubricate the seats independently, effective lubrication may also be provided by injecting lubricant into the lubricant grooves in both seats simultaneously, simply by providing a suitable lubricant connection (as for example an external manifold) so that when the lubricant is being compressed it flows to both seats at the same time. When sufficient lubricant pressure is generated for jacking, the action which takes place in effect separates both seats from the plug by hydraulically jacking the seats against the springs which hold the seats against the plug and the yielding means provided in the body which support the seats. However, it is generally preferable to provide individual jacking of the seats from the plug since a higher jacking pressure can be thus generated if the lubricant employed be of reduced consistency or if only one of the seats be frozen to the plug.

It will be apparent from the foregoing description that the construction which makes use of interchangeable parts permits use of special corrosion-resisting materials for the seats or plug without the necessity of making the entire valve of such high cost materials. On certain valve services the nature and degree of the corrosive influences present do not warrant manufacturing the entire valve of expensive corrosion-resistant materials, but their employment for certain critical portions of the valves may be justified for providing at a minimum cost an increased degree of service. With my improved valve, even after having been placed in service, if later found to be desirable, the valve may be removed and new corrosion-resisting seats or other parts may be easily substituted for the original parts supplied, or new parts similar to the original worn parts may be used as replacements without renewing the entire valve. Likewise, should it be found desirable to renew certain parts of the valve, such as seats by coating with an overlay of "Stellite" or other corrosion-resisting materials, which require heating the base metal to high temperatures and subsequently machining or grinding these parts to the required finish, this can be done at less cost and without ruining the valve body than as is the case when such repairs are made on the conventional types of valve bodies in which the seats are integral with the body.

While the drawings included with this application show a ball plug which is essentially a sphere, it should be noted that this may be attenuated at the portions which do not form part of the seating surfaces or are otherwise required for the proper functioning of the valve, as a means of reducing the cost or weight of the over-all structure. Thus a segment of the ball plug may be removed at the bottom or top where such metal is not required for proper functioning of the valve. Also a portion of the interior of the ball plug may be cored out to reduce its weight and cost, or the plug may be fabricated by building it up from welded metal parts. In all cases, however, the essential features of the ball contour in relation to its functioning in conjunction with the spherical contour of the seating surfaces of the seats must be preserved.

While the turning torques of my improved valve are unusually low, in the large valve sizes and for high line pressures various operating mechanisms such as electric or fluid motors or pistons and cylinders may be used.

The foregoing structural variances are desirable in view of the wide range of valve sizes and operating pressures for which my improved valves are adapted.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In a valve, a body having coaxial flow passages, a ported plug rotatable within said body between open and closed positions through a path about an axis normal to the line of flow through said passages, means providing seats for said plug on opposite sides thereof comprising cooperating annular spherical surfaces on said plug and on said body surrounding said passages, means for introducing lubricant under pressure between the seating surfaces of said body and plug on at least one side of the plug for separating said surfaces, and means in said body effective to resiliently control separation of said seating surfaces without substantial deformation of said seat surfaces, said last-named means enabling said surfaces to be separated sufficiently to permit the establishing of a film of sealing properties but at the same time limiting said separation to prevent undue spacing of the surfaces such as might result in substantial discharge of lubricant beyond said surfaces.

2. In the valve defined in claim 1, said body seat surfaces being on separate rings mounted within said body at opposite sides of the plug, and said last-named means comprising means in the body wall so constructed and arranged as to resiliently oppose the forces exerted by said surface separating means.

3. In the valve defined in claim 1, said separable body seat surfaces each being on a separate ring axially slidably mounted within the body and said last-named means comprising a spring between the ring and the body.

4. In a valve, a body having coaxial fluid flow passages, a ported ball rotatable between open and closed positions within said body about an axis normal to the line of fluid flow through said passages, means providing non-integral rigid annular seats within said body surrounding said passages on opposite sides of the ball, said ball and seats having cooperating sets of spherical seating surfaces, resilient reacting means in the body urging said seats constantly against opposite sides of said ball, and means for introducing viscous plastic lubricant under pressure between said sets of spherical surfaces on opposite sides of the ball for establishing effective uniform thickness sealing films of lubricant between said surfaces, said lubricant pressure for so introducing the lubricant exerting a force sufficiently higher than and so related to said resilient means as to sufficiently controllably separate said surfaces only enough to permit spreading of the lubricant therebetween within a reasonable time but not to separate said surfaces sufficiently to permit non-uniform discharge of said lubricant into the fluid line, said reacting resilient means substantially maintaining said established effective lubricant film thickness between both sets of surfaces in both open and closed positions of the ball after said lubricant introduction pressure has been terminated.

5. In a valve, a body having coaxial fluid flow passages, a ported plug rotatable through an arc about an axis normal to the line of fluid flow controlling flow or shutoff of the line fluid, seat rings separate from said body surrounding the inner ends of said passages and mounted for limited shift axially of said passages, said plug and seat rings having coacting annular spherical seating surfaces, means for introducing lubricant under pressure between said surfaces for establishing a sealing film of effective thickness, reacting resilient means urging said seat rings against said plug when the valve is open, and means whereby upstream line fluid pressure is applied against the upstream seat ring, both of said seats thereby being maintained against said plug to provide both upstream and downstream seals and to effectively shield the seating surfaces against the action of line fluid whether the valve is open or closed.

6. A valve structure comprising a body having circular inlet and outlet ports, a rotatable substantially spherical plug ported with a circular passageway for permitting flow or shut off of the line fluid mounted within the body for rotation through an arc of 90° between valve fully open and closed positions, an annular downstream seat coacting with and surrounding the outlet body port, an annular upstream seat coacting with and surrounding the upstream port, said plug being positioned and supported only by the coacting surfaces of said upstream and downstream seats which in turn are positioned within the body to effect proper alignment with the body ports, a non-integral rotatable operating stem packed to prevent exterior leakage through the body wall and operatively connected for effecting rotation of the plug, means for hydraulically jacking the plug from said downstream seat during any degree of rotation of the plug for separating the coacting surfaces of the ball plug and downstream seat for the purpose of establishing a lubricating and sealing film of plastic lubricant or for freeing the said coating surfaces if they become stuck or frozen together, and resilient means acting in opposition to the jacking pressure for returning the plug to said downstream seat.

7. In a valve, a body having coaxial fluid flow passages, a ported plug rotatable through an arc about an axis normal to the line of fluid flow controlling flow or shutoff of the line fluid, annular seat members within said body at opposite sides of said plug each surrounding one of said passages, said plug being supported solely by said seat members, co-acting spherical seating surfaces on said plug and seat members, reacting resilient means urging said seat members against said plug, distributing grooves in said spherical seating surfaces of said plug and seat members providing for distribution of lubricant under pressure to forcibly separate said surfaces against said reacting resilient means for the establishment of sealing and lubricating films thereon in any position of said plug through its arc of rotation between its fully open and fully closed positions, and means providing for rotation of said plug about said axis only in a predetermined direction to open position and only in the opposite direction to closed position while maintaining lubricant under pressure.

8. In a valve, a body having upstream and downstream fluid flow passages, a ball rotatable in the body and having a through port adapted to interconnect said body passages in fully open valve position, seat rings in said body each having a continuous area surrounding one of said passages in full spherically curved surface contact with said ball, reacting resilient means in the body urging both of said seat rings against said ball, two grooves formed in each of said seating surfaces separated at adjacent ends by a land that comprises a substantial continuation of said area, grooves on said ball located to bridge said lands only in substantially fully open and fully closed valve positions of said ball, means providing for rotation of said ball about an axis normal to the path of fluid flow through said body through a predetermined angle only in a predetermined direction to open position and only in the opposite direction to closed position, and means for introducing lubricant under pressure through said body into that groove of each seat ring surface that is not exposed to line fluid during rotation of the ball between said positions whereby said ball and a seat ring may be jacked apart in any position of rotation of said ball intermediate said fully open and closed positions.

9. In a valve, a body having inlet and outlet passages, a ball rotatably mounted in said body and having a through port adapted to connect said body passages when the valve is open, an annular seat ring surrounding each passage in said body and having a spherically curved surface in contact with a correspondingly curved surface of said ball, reacting resilient means urging both of said seat rings against said ball, lubricant groove means in each of said seat surface extending substantially entirely around said seat but interrupted by at least one land which comprises a substantial continuation of said seat surface and separates adjoining groove portions, a pair of short grooves in the ball surface adapted to bridge said land and establish fluid communication between said adjoining groove portions only when the valve is in substantially fully open or fully closed positions, means providing for rotation of said ball through a predetermined angle between fully open and fully closed positions about an axis normal to the path of fluid flow through said body only in a predetermined direction to open position and only in the opposite direction to closed position, and means for introducing lubricant under pressure through said body into the portions of said groove means not exposed to line fluid as the valve ball rotates between substantially fully open and fully closed valve positions so that said ball and a seat ring may be jacked apart in any position of rotation of the ball intermediate said fully open and closed positions.

10. In a ball valve, a body having inlet and outlet ports, a ball rotatably mounted in said body and having a through port adapted to connect said body ports when the valve is open, means providing a pair of spherical section seat surfaces on said body respectively surrounding the body inlet and outlet parts in contact with corresponding continuous spherical surfaces on opposite sides of the ball, lubricant groove means in each of said spherical seat surfaces extending substantially entirely around the seat but interrupted by at least one land which comprises a substantial continuation of the seat surface and separates adjoining groove portions, a plurality of short grooves in the spherical ball surfaces of sufficient length to bridge the lands in each seat and establish fluid communication between adjoining groove portions only when the valve is in substantially fully open or fully closed position, reacting resilient means urging said seat surfaces against said ball surfaces, means for introducing lubricant under pressure into said groove means for jacking apart said ball and a seat surface in any position of rotation of said ball, and means for rotating said ball between its open and closed positions comprising a stem extending through and journaled in said body and having a connection with said ball that permits limited axial shift of the ball parallel to the axis of said ports but prevents substantial tilt of the ball relative to the stem axis to preserve operative alignment of said short grooves with the seat surface grooves.

11. In a ball valve, a body having oppositely disposed ports each surrounded by a rigid ring providing continuous spherical sector seating surfaces facing each other within said body, a ported ball rotatable in said body on said seats, reacting resilient means in said body urging both of said rings against said ball, a pair of grooves in each of said seats separated by substantially diametrically opposite lands that are extensions of the seat surfaces, four pairs of short lubricant grooves on said ball of sufficient length to bridge said lands so as to provide substantially continuous seating surface grooving around said ports in only substantially fully open and fully closed valve positions of rotation of said ball, means on said body providing an individual reservoir of lubricant for each of said seats, a passage from one of said reservoirs through one of said seat rings to one of the grooves of the seating surface at one side of the ball, a second passage from the other of said reservoirs through the other of said seat rings to a groove of the seating surface at the other side of said valve, said passage connected grooves being on opposite sides of the axis of fluid flow through the valve ports, means for rotating said ball between fully open and fully closed positions so that only the grooves in the seats that are not connected to the reservoirs may be exposed to line fluid during such rotation, and means for increasing the lubricant pressure in each reservoir for applying increased lubricant pressure to either seat for separating the ball from said either seat in any position of rotation of said ball.

12. In a valve, a body having inlet and outlet passages, a ported ball rotatable in said body, an annular downstream seat ring within said body surrounding said outlet passage, means providing a continuous sealing film of lubricant under pressure on the downstream seating surface of said ball in predetermined positions of rotation of the ball comprising coacting grooving in the seat ring and ball surfaces, means for supplying lubricant under pressure through said seat grooving that is not exposed to line fluid when the ball is rotated between said positions, and a slidably mounted upstream seat ring resiliently maintained in close contact with the surface of said ball.

13. In a valve for a high fluid pressure line, a body having inlet and outlet passages, a ported ball rotatable in said body, a rigid annular downstream seat ring mounted on said body surrounding said outlet passage, means providing a substantially continuous band of lubricant under pressure on the downstream seating surface of said ball in predetermined positions of rotation of the ball comprising coacting grooving in the seat and ball surfaces, a reservoir for holding a quantity of lubricant under pressure and a body passage between the reservoir and a portion of the seat grooving that is not exposed to line fluid when the ball is rotated between said positions, and a slidably mounted upstream seat resiliently maintained in close contact with the surface of said ball.

14. In a valve, a body, a ported ball rotatable in the body, rigid annular upstream and downstream seats in said body at least one of which is slidable in a direction normal to the axis of rotation of the ball, grooving for establishing a substantially continuous band of lubricant under pressure at the downstream seating surface of said ball in predetermined positions of rotation of said ball, a lubricant reservoir in said valve for a quantity of lubricant under pressure, and passage means for establishing communication between the reservoir and all of said grooving substantially only when the ball is in said predetermined positions and for cutting off the supply of lubricant to part of said grooving while retaining communication with the remainder of said grooving when the ball is being rotated between said positions.

15. In a valve, a body having coaxial fluid flow passages, a ported ball rotatable within said body between positions where it interconnects or shuts off fluid flow through said passages, annular seat members disposed within the body at opposite sides of said ball each surrounding one of said passages and mounted for limited axial shift with respect to the associated passage, said ball being positioned and supported within the body only by said annular seat members, means providing for rotation said ball only in a predetermined direction to open position and for rotation only in the opposite direction to closed position, and means for hydraulically jacking the ball from either of said seat members during any position of rotation of the ball for separating the coacting surfaces of the ball and that seat member for permitting the establishment of a lubricating and sealing film of plastic material or for freeing said coacting surfaces if they are stuck together as by corrosion.

16. In a valve, a body having coaxial fluid flow passages, a ported ball rotatable within said body about an axis normal to the line of fluid flow between angularly related positions where it interconnects or shuts off fluid flow through said passages, means providing for rotation of said ball only in a predetermined direction to open position and only in the opposite direction to closed position, an annular seat mounted within the body surrounding one of said passages for limited axial shift with respect to said passages, an annular seat mounted within the body surrounding the other of said passages for limited axial shift with respect to said passage, said ball being positioned and supported within the body only by said annular seats, and means for hydraulically jacking the ball from either of said seats during any position of rotation of the ball for separating the coacting surfaces of the ball and that seat for establishing a lubricating and sealing film of plastic material or for freeing said coacting surfaces if they are stuck together as by corrosion.

17. In a ball valve, a body having coaxial fluid flow passages, seat rings surrounding the inner ends of each of said passages and mounted for limited shift on said body axially of said passages, said seat rings having spherical surfaces facing each other within the body, a ball plug having on its opposite sides spherical surface areas engaging the spherical surfaces of said seat rings so that said plug is positioned and supported within said body wholly by said seat rings for rotation about an axis normal to the line of fluid flow through said body, a separate operating stem for said ball rotatably mounted in fluid tight relation with said body and operatively connected to said ball to permit limited shift of said ball in the direction of either of said seats, groove means in each of said seat ring spherical surfaces extending substantially entirely around the seat but being interrupted by at least one land that is a substantial continuation of said seat surface, short grooves in the spherical plug surface circumferentially aligned with said groove means in the assembly and adapted to bridge said land in fully open and fully closed valve positions of rotation of the plug to provide grooves continuously about said seats in said positions, and means for introducing plastic sealing and lubricating material under pressure into said seat ring groove means for relatively separating said spherical surfaces in all positions of rotation of said valve plug.

18. In the ball valve defined in claim 17, means in said operative connection between the stem and plug maintaining said plug against substantial tilting on said seat rings with respect to the axis of said stem so as to preserve alignment of said groove means in the seat rings and the corresponding short grooves in the plug surface.

19. In a valve, a body having inlet and outlet ports, a substantially spherical ball valve element rotatable in said body and having a through port connecting the body ports when the valve is open, an annular seat mounted in said body surrounding the body outlet port and having a spherical sector surface in contact with one side of the ball surface, an annular seat mounted in said body surrounding the body inlet port and having a spherical sector surface in contact with the other side of the ball surface, each of said seats being mounted for displacement axially of said ports, fluid tight seals between said seats and said body, lubricant grooving extending substantially entirely around each of said seating surfaces and means for hydraulically separating said contacting spherical surfaces for spreading a film of lubricant thereover and for freeing the ball element for rotation comprising means for introducing lubricant under pressure directly from exteriorly of said body into said grooving.

20. In a valve, a body having coaxial fluid flow passages, a ported plug rotatable through a predetermined angle about an axis normal to the line of fluid flow controlling flow or shutoff of the line fluid, and individual rigid annular seat members within said body at opposite sides of said plug each surrounding one of said passages and floatingly mounted axially of said passages, co-acting spherical seating surfaces on said plug and seat members so that the plug is supported wholly by said seat members, said body being so constructed and arranged as to provide resilient means axially urging said seat members against said plug, grooving in said seating surfaces providing for distribution of lubricant to forcibly separate said surfaces for the establishment of sealing and lubricating films thereon, and means providing for rotation of said plug about said axis only in a predetermined direction to open position and only in the opposite direction to closed position while maintaining lubricant under pressure in at least part of said grooving, said plug and seat members during normal operation being shiftable together axially of said passages and maintaining seat alignment and uniform load distribution over said surfaces regardless of body distortion due to line fluid pressure and mechanical strains.

21. In a ball valve assembly, a body having coaxial inlet and outlet ports, annular ball seats within said valve body comprising identical surfaces of revolution surrounding said ports, a ball mounted within said body on said seat surfaces for rotation about an axis normal to the axis of said ports, means providing for rotation of said ball only in a predetermined direction to open position and only in the opposite direction to closed position, said ball having a through port adapted to interconnect said body ports when the ball is rotated to valve open position, a lubricant reservoir for holding a supply of lubricant under pressure connected to a passage in said body, coacting grooving in at least the downstream seating surfaces of the ball and body connected to said passage adapted to receive lubricant under pressure from said reservoir, means in said grooving for automatically cutting off communication between said reservoir passage and that portion of the grooving which is exposed to line fluid during rotation of the ball between substantially fully open and fully closed valve positions and for providing a continuous band of lubricant around said downstream seat in communication with said reservoir connected passage in only the substantially fully open and fully closed valve positions of rotation of said ball, and means for increasing the lubricant pressure in that portion of the grooving which is not so exposed to line fluid for jacking the ball and a seat ring apart in any position of rotation of the ball intermediate said fully open and fully closed positions, the other of said valve body seats comprising a separate axially movable ring mounted in an internal shoulder in said body, and a spring ring mounted between the back of said seat ring and the body for normally resiliently urging said seat ring against the ball but permitting axial displacement of the seat ring when lubricant pressure is applied to said downstream valve seat.

22. In a ball valve assembly, a valve body having a passage therethrough, a ported ball rotatably mounted in said body for aligning its port with or cutting off said passage, annular seat rings in said body surrounding said passage and engaging opposite sides of the ball, said seat rings being mounted for limited displacement with respect to said body axially of said passage, and means for introducing plastic sealing material under pressure from exteriorly of said body through each of said seat rings to the seating surfaces between the ball and said rings for separating said surfaces by relative displacement of the ball and either ring to establish sealing films of effective thickness at said surfaces, said means providing a continuous unbroken passage between the body and seat rings regardless of displacement of either ring with respect to the body.

23. In the ball valve assembly defined in claim 22, said means for introducing said sealing material comprising conduit sections that are relatively movable with respect to the body and a displaceable seat ring.

24. In a valve assembly, a valve body, a valve seat ring mounted for chiefly translatory displacement within the body, a ball rotatably seated on said ring, a passage through said seat ring for providing a layer of plastic sealing material between the seating surfaces of said ball and ring, an inlet passage for plastic sealing material in said body, and conduit means interconnecting said passages for maintaining continuous uninterrupted transmission of said sealing material to said seating surfaces in all positions of displacement of the ring on the body.

25. In the valve assembly defined in claim 24, said passages having aligned adjacent ends, and said conduit means comprising a hollow member slidably bridging said adjacent passage ends.

26. In the valve assembly defined in claim 25, liquid tight sealing means between the external periphery of said hollow member and each said passages.

27. In the valve assembly defined in claim 24, said passages being substantially aligned at adjacent ends, and said conduit means comprising a laterally flexible hollow member bridging said adjacent passage ends.

28. In a valve assembly, a valve body, a valve seat ring mounted for chiefly translatory displacement within the body, a ball rotatably seated on said ring, a passage through said seat ring for providing a layer of plastic sealing material between the seating surfaces of said ball and ring, an inlet passage for plastic sealing material in said body, and means maintaining continuous uninterrupted communication between said passages in all positions of displacement of the ring on the body comprising a laterally flexible conduit slidably bridging said adjacent passage ends.

29. In a ball valve, a hollow body having two spaced internal valve seat rings that are mounted for displacement toward each other, a rotatable ball having annular spherical zone seating surface engagement with said seat rings, a thin layer of plastic sealing material disposed between the seating surfaces of said ball and rings, a reservoir containing a compressed body of said material under pressure in communication with each said layer, said material being energized and expansible throughout its entire mass so that it continuously tends to renew and maintain said layer between said surfaces, and resilient means between each seat ring and the body, each of said resilient means exerting on its associated ring a force substantially equal and opposed to the force exerted by said energized material, so that undesired separation of the ball and seat rings is normally prevented.

30. In the ball valve defined in claim 29, said resilient means comprising springs compressed between the body and the backs of said seat rings.

31. In a valve, a body having inlet and outlet ports, a metal ball valve element rotatable in said body and having a through port connecting the body ports when the valve is open, an annular downstream metal seat mounted on an internal shoulder in said body surrounding the body outlet port and having a spherical sector surface in metal to metal contact with a corresponding spherical surface on one side of the ball, an annular upstream metal seat mounted on an internal shoulder in said body surrounding the body inlet port and having a spherical sector surface in metal to metal contact with a corresponding spherical surface on the other side of the ball, each of said seats comprising a rigid annulus distinct from said body, and lubricant grooving extending substantially entirely around each of said seating surfaces, said body being resiliently deformable axially of said body parts to permit displacement of the ball from either of said seats by lubricant pressure in said grooving and being appreciably more resistant to deformation by reason of said lubricant pressure in other directions.

32. In a fluid flow control valve assembly, a valve casing comprising separable parts, means for rigidly securing said casing parts together, a port opening in each said casing part coaxial with the axis of fluid flow through said valve assembly, individual rigid seat rings mounted in the respective casing parts so as to be axially backed by said parts and to surround said ports, each said seat ring having a continuous spherically curved surface symmetrical about said flow axis and facing internally of said casing, a ball mounted in said casing for rotation about an axis normal to said flow axis and having on opposite sides continuous spherically curved surfaces that seat on said internal seat ring surfaces during rotation of the ball between open and closed positions, a through port in said ball that is aligned with said casing ports when the valve assembly is open, and means for introducing plastic sealing material under pressure through said seat rings and between either pair of spherical ball seating surfaces for separating said surfaces to provide a layer of said material therebetween and free them if stuck together, said casing parts being so constructed and arranged to provide deformation of the casing mainly axially of said fluid flow axis when a predetermined ball jacking pressure is applied to the sealing material at said seating surfaces.

33. In a fluid flow control valve assembly, a valve casing comprising axially separable parts contacting along axially facing surfaces lying substantially in a plane that intersects the axis of fluid flow through the valve, a port opening in each said casing part coaxial with said flow axis, individual rigid seat rings mounted in the respective casing parts so as to be axially backed by said parts and to surround said ports, each said seat ring having a continuous spherically curved surface symmetrical about said flow axis and facing internally of said casing, a ball mounted in said casing for rotation about an axis normal to said flow axis and having on opposite sides continuous spherically curved surfaces that seat on said internal seat ring surfaces during rotation of the ball between open and closed positions, a through port in said ball that is aligned with said casing ports when the valve assembly is open, means for introducing plastic sealing material under pressure through said seat rings and between either pair of spherical ball seating surfaces for separating said surfaces to provide a layer of said material therebetween and free them if stuck together, and means for securing said casing parts rigidly together, said casing parts being so constructed and arranged to provide deformation of the casing mainly axially of said fluid flow axis when predetermined ball jacking pressure is applied to the sealing material at said seating surfaces.

34. In a ball valve assembly, a hollow body having a substantially cylindrical wall, an integral end wall having a fluid flow passage therethrough and a removable opposite end wall having a fluid passage therethrough, seat rings at opposite ends of the body surrounding said passages axially slidably mounted in said end walls and formed with coaxial surfaces of spherical contour facing each other, a ported ball adapted to interconnect said passageways or shut off fluid flow through the valve rotatably seated within said body on said surfaces for movement between open and closed positions on an axis substantially normal to the axis of fluid flow through the body, means for limiting the axial displacement of each of said seat rings to a predetermined small amount, means for introducing a plastic sealant material under pressure between the seating surfaces of the ball and at least one of said seat rings for separating those surfaces by relative displacement of the ball and said one seat ring, and a stem projecting through said cylindrical wall into operative engagement with said ball.

35. In the ball valve assembly defined in claim 34, said cylindrical wall being open at the end to which said removable end wall is secured so that the ball may be inserted therethrough during initial assembly, and said removable end wall being formed with an annular flange surrounding the associated seat ring and piloted within the end of said cylindrical wall.

36. In a valve, a body having coaxial fluid flow passages, a ported ball rotatable within said body between positions where it interconnects or shuts off fluid flow through said passages, cooperating sets of annular spherical seating surfaces on the body and ball surrounding said passages at opposite sides of said ball, means for introducing lubricant under pressure between said sets of surfaces for establishing a sealing film of effective thickness, reacting resilient means urging said seat rings against said plug, and means providing a bleeder passage through the body wall intermediate said seating surfaces for detecting leakage past the upstream seat when the valve is closed.

References Cited in the file of this patent

UNITED STATES PATENTS

| Number | Name | Date |
|---|---|---|
| 982,815 | Hobbs | Jan. 31, 1911 |
| 1,616,386 | O'Stroske | Feb. 1, 1927 |
| 1,746,609 | Schellin | Feb. 11, 1930 |
| 1,770,900 | Dawson | July 22, 1930 |
| 1,906,266 | Hoffman | May 2, 1933 |
| 2,030,458 | McKellar | Feb. 11, 1936 |
| 2,049,805 | Heinen | Aug. 4, 1936 |
| 2,333,424 | Humphreys | Nov. 2, 1943 |
| 2,356,630 | Strecker | Aug. 22, 1944 |
| 2,373,628 | Gleeson | Apr. 10, 1945 |
| 2,433,638 | Volpin | Dec. 30, 1947 |
| 2,445,580 | Kasten | July 20, 1948 |
| 2,516,947 | Blevans | Aug. 1, 1950 |
| 2,520,288 | Shand | Aug. 29, 1950 |
| 2,525,951 | Sanborn | Oct. 17, 1950 |
| 2,573,177 | Bohlen | Oct. 30, 1951 |

FOREIGN PATENTS

| Number | Country | Date |
|---|---|---|
| 416,682 | Great Britain | of 1933 |